(12) United States Patent
Shin et al.

(10) Patent No.: US 11,044,260 B2
(45) Date of Patent: Jun. 22, 2021

(54) FINGERPRINTING ELECTRONIC CONTROL UNITS FOR VEHICLE INTRUSION DETECTION

(71) Applicant: THE REGENTS OF THE UNIVERSITY OF MICHIGAN, Ann Arbor, MI (US)

(72) Inventors: Kang G. Shin, Ann Arbor, MI (US); Kyong-Tak Cho, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 680 days.

(21) Appl. No.: 15/472,861

(22) Filed: Mar. 29, 2017

(65) Prior Publication Data

US 2017/0286675 A1 Oct. 5, 2017

Related U.S. Application Data

(60) Provisional application No. 62/316,932, filed on Apr. 1, 2016.

(51) Int. Cl.
*H04L 29/06* (2006.01)
*G06F 21/55* (2013.01)
(Continued)

(52) U.S. Cl.
CPC ............ *H04L 63/1416* (2013.01); *G06F 1/12* (2013.01); *G06F 21/552* (2013.01);
(Continued)

(58) Field of Classification Search
CPC ..... H04L 63/1416; H04L 67/12; H04L 69/28; H04L 2463/121; G06F 1/12; G06F 21/552; G06F 2221/034
See application file for complete search history.

(56) References Cited

U.S. PATENT DOCUMENTS 6,760,716 B1\* 7/2004 Ganesamoorthi .... G05B 13/027
706/14
7,342,972 B1\* 3/2008 Giannakis .......... H04B 1/71632
375/133
(Continued)

FOREIGN PATENT DOCUMENTS

CN 103237308 B 5/2015
JP 20067960 A 1/2006
(Continued)

OTHER PUBLICATIONS

Hauke Webermann, "CAN send and receive with hardware timestamping", Mar. 2017, esd electronic system design gmbh (Year: 2017).\*
(Continued)

*Primary Examiner* — Kambiz Zand
*Assistant Examiner* — Arezoo Sherkat
(74) *Attorney, Agent, or Firm* — Harness, Dickey & Pierce, P.L.C.

(57) ABSTRACT

An anomaly-based intrusion detection system is presented for use in vehicle networks. The intrusion detection system measures and exploits the intervals of periodic in-vehicle messages for fingerprinting electronic control units. Fingerprints are then used for constructing a baseline of clock behaviors, for example with a Recursive Least Squares algorithm. Based on the baseline, the intrusion detection system uses cumulative sum to detect any abnormal shifts in the identification errors—a clear sign of an intrusion. This approach allows quick identification of in-vehicle network intrusions with low false positive rates.

20 Claims, 13 Drawing Sheets

(51) Int. Cl.
*G06F 1/12* (2006.01)
*H04L 29/08* (2006.01)

(52) U.S. Cl.
CPC .... *H04L 63/0876* (2013.01); *G06F 2221/034* (2013.01); *H04L 67/12* (2013.01); *H04L 69/28* (2013.01); *H04L 2463/121* (2013.01)

(56) References Cited

U.S. PATENT DOCUMENTS

| | | | |
|---|---|---|---|
| 2005/0201560 A1* | 9/2005 | Dube | G01S 19/14 380/255 |
| 2011/0222421 A1 | 9/2011 | Jana et al. | |
| 2013/0080817 A1* | 3/2013 | Mihelic | G06F 1/10 713/401 |
| 2014/0201126 A1* | 7/2014 | Zadeh | G06K 9/627 706/52 |
| 2014/0247122 A1 | 9/2014 | Moeller et al. | |
| 2014/0250530 A1 | 9/2014 | Moeller et al. | |
| 2015/0020152 A1* | 1/2015 | Litichever | H04L 63/14 726/1 |
| 2015/0074809 A1 | 3/2015 | Thomas et al. | |
| 2015/0089236 A1* | 3/2015 | Han | H04L 9/3242 713/181 |
| 2015/0092797 A1* | 4/2015 | Aweya | H04J 3/0667 370/516 |
| 2015/0113638 A1 | 4/2015 | Valasek et al. | |
| 2015/0188664 A1* | 7/2015 | Glosser, Jr. | H03M 13/05 714/776 |
| 2015/0195297 A1 | 7/2015 | Ben Noon et al. | |
| 2016/0188396 A1* | 6/2016 | Sonalker | G06F 11/0739 714/37 |
| 2016/0330012 A1* | 11/2016 | Liu | H04J 3/0664 |
| 2018/0204011 A1* | 7/2018 | Nakano | G06F 21/577 |

FOREIGN PATENT DOCUMENTS

| | | |
|---|---|---|
| KR | 1020150131669 A | 11/2015 |
| WO | WO-2014010827 A1 | 1/2014 |
| WO | WO-2015170451 A1 | 11/2015 |

OTHER PUBLICATIONS

Ivan Studnia et al "Security of Embedded Automotive Networks: State of the Art and a Research Proposal" Safecomp 2013—Workshop CARS of the 32nd International Conference on Computer Safety, Reliability and Security, Toulouse, France (Sep. 2013).
Leandros A. Maglaras, "A Novel Distributed Intrusion Detection System for Vehicular Ad Hoc Networks" International Journal of Advanced Computer Science and Applications, vol. 6, No. 4 (2015).
M. Khattab et al "An Intrusion Detection System Against Malicious Attacks on the Communication Network of Driverless Cars" Consumer Communications and Networking Conference (CCNC), 2015 12th Annual IEEE, (Jan. 2015).

* cited by examiner

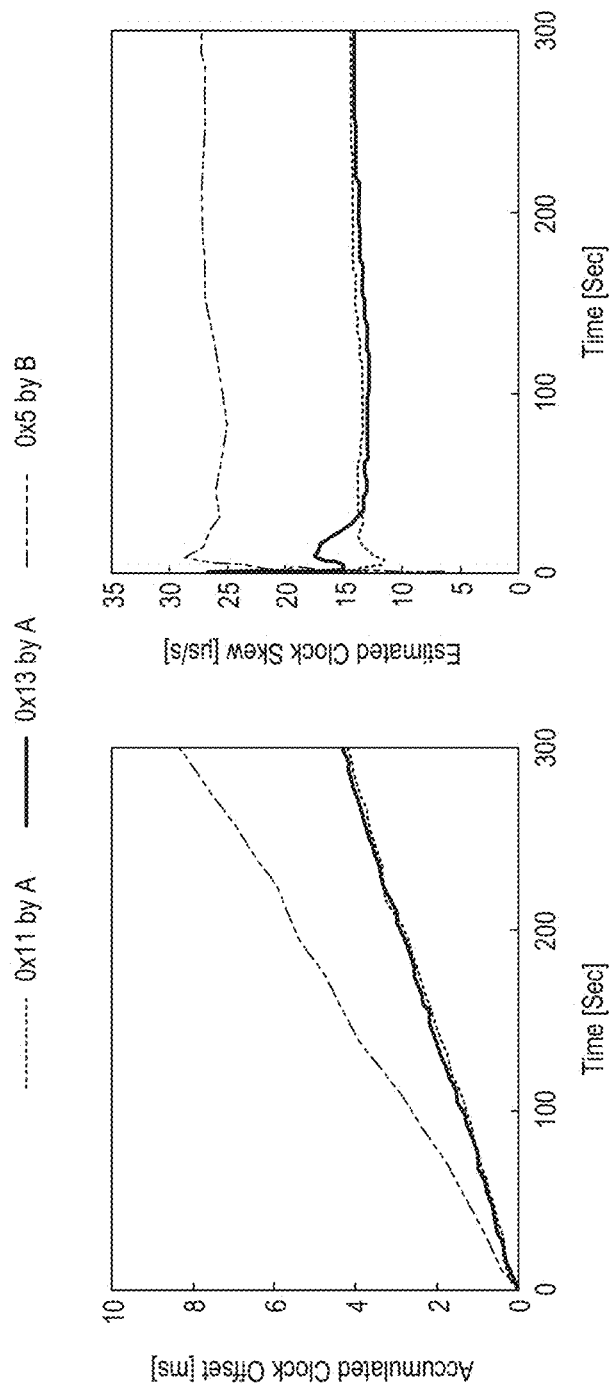

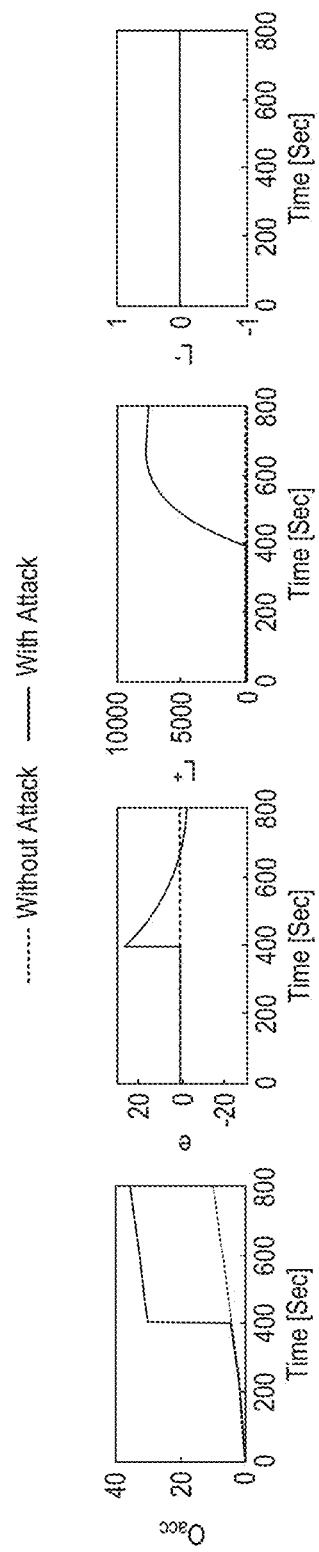

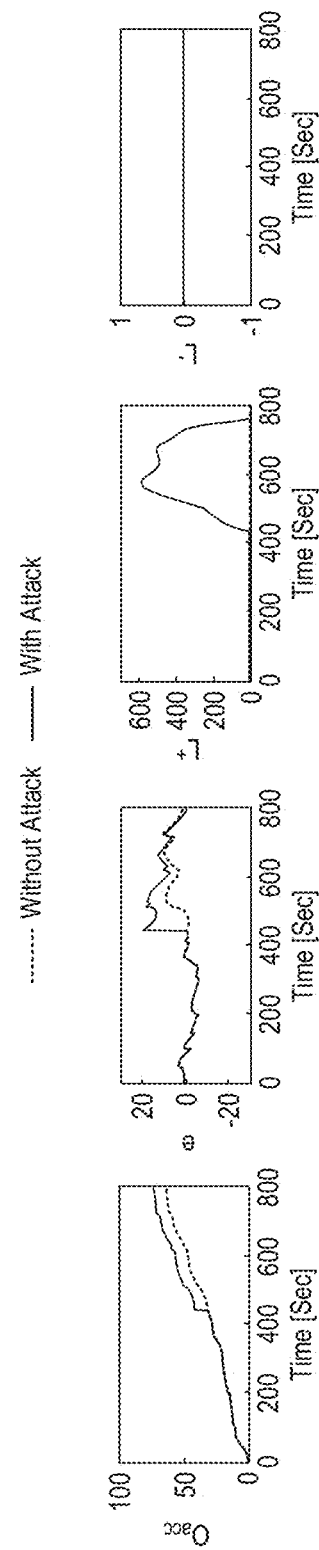

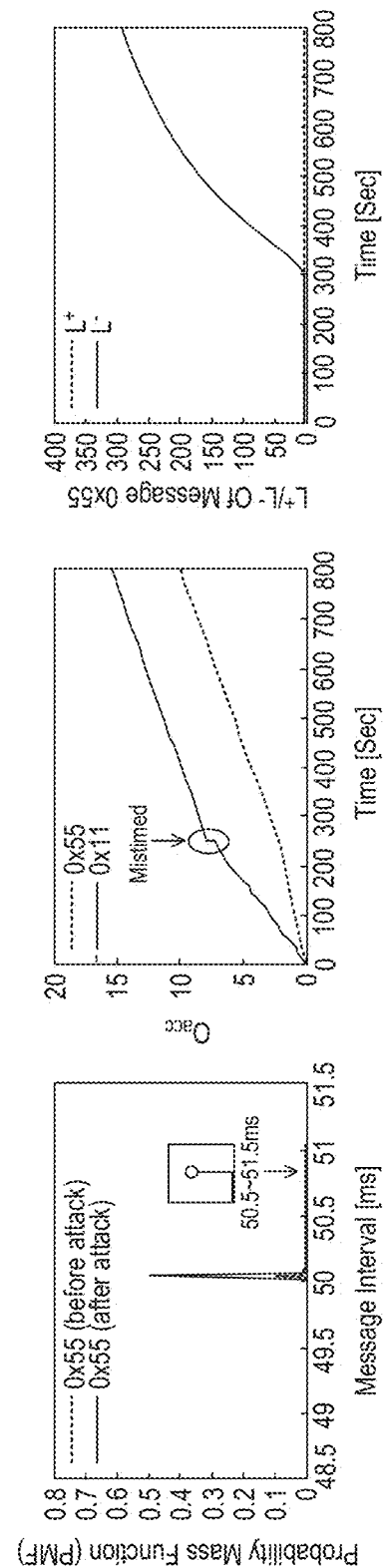

FINGERPRINTING ELECTRONIC CONTROL UNITS FOR VEHICLE INTRUSION DETECTION

CROSS-REFERENCE TO RELATED APPLICATIONS

This application claims the benefit of U.S. Provisional Application No. 62/316,932, filed on Apr. 1, 2016. The entire disclosure of the above application is incorporated herein by reference.

FIELD

The present disclosure relates to fingerprinting electronic control units for vehicle intrusion detection.

BACKGROUND

Vehicle security is now becoming a serious and realistic concern due to new security breaches in vehicles. Researchers have systematically analyzed different attack vectors in vehicles (e.g., Bluetooth, Cellular, PassThru), and have shown that in-vehicle Electronic Control Units (ECUs) can be compromised for mounting an attack remotely. Through a compromised ECU, the adversary can control vehicle maneuver by injecting packets in the in-vehicle network. Researchers have recently been able to compromise and remotely stop a Jeep Cherokee running on a highway, which triggered a recall of 1.4 million vehicles. Such a reality of vehicle attacks has made automotive security one of the most critical issues.

As a countermeasure against such attacks on in-vehicle networks, two main lines of defense have been proposed: message authentication and intrusion detection. Although message authentication provides a certain level of security, despite its efficiency and feasibility for Internet security, the limited space available for appending a Message Authentication Code (MAC) in in-vehicle messages, and the requirements of real-time processing and communication hinder its adoption.

Various types of Intrusion Detection Systems (IDS) have also been proposed. The essence of state-of-the-art IDSs is to monitor the contents and periodicity of in-vehicle messages and verify whether there are any significant changes in them. Since they are either constant or predictable in in-vehicle networks, such approaches can be feasible in most circumstances. However, there still remain critical attacks which existing IDSs can neither detect nor prevent, for two main reasons: 1) in-vehicle messages lack information on their transmitters and thus do not know whether they originate from genuine transmitters; and 2) lack of the transmitter's information makes it very difficult or impossible for state-of-the-art IDSs to identify which ECU has mounted an attack.

To overcome these limitations, and thus defend against various vehicle attacks, this disclosure proposes a new anomaly-based IDS, called Clock-based IDS (CIDS). The need for CIDS in vehicles is motivated through an analysis on three representative in-vehicle network attacks: fabrication, modification, and masquerade attacks. Analysis shows that state-of-the-art IDSs are insufficient especially in detecting the masquerade attack due to the lack of the transmitter's information in messages. The proposed CIDS method overcomes such limitations of existing IDSs via fingerprinting in-vehicle ECUs.

This section provides background information related to the present disclosure which is not necessarily prior art.

SUMMARY

This section provides background information related to the present disclosure which is not necessarily prior art.

A method is presented for detecting intrusions in a vehicle network. A plurality of messages are received by a recipient ECU from a transmitting ECU, where the plurality of messages are transmitted periodically from the transmitting ECU via the vehicle network to the recipient ECU and the plurality of messages do not include any timestamp information from the transmitting ECU. The method includes: determining a clock skew for the transmitting ECU from the plurality of messages; detecting a sudden change in the clock skew for the transmitting ECU by comparing the clock skew for the transmitting ECU to a baseline value for the clock skew of the transmitting ECU; and identifying the transmitting ECU as compromised in response to detecting a sudden change in the clock skew for the transmitting ECU.

In one embodiment, clock skew is determined by determining a clock offset for each message in the plurality of messages, where clock offset is determined in relation to a first message received from amongst the plurality of messages; determining an accumulated clock offset for the plurality of messages by summing the determined clock offsets together; and determining the slope of the accumulated clock offset.

The baseline value for the clock skew of the transmitting ECU may be determined from additional messages transmitted by the transmitting ECU and receive by the recipient ECU prior to the receipt of the plurality of messages. The baseline value for the clock skew may be determined using linear regression.

In some embodiments, the sudden change in the clock skew may be determined using a cumulative sum method.

Upon detecting a sudden change in the clock skew, different protective operations may be implemented, including but not limited to disabling the transmitting ECU.

In another aspect, the method for detecting a compromised electronic control unit in a vehicle network further includes: determining a clock offset for each message in the plurality of messages, where clock offset is determined in relation to a first message received from amongst the plurality of messages; determining an accumulated clock offset for the plurality of messages by summing the determined clock offsets together; computing a difference between the accumulated clock offset to a baseline clock offset; detecting a sudden change in the difference between the accumulated clock offset and the baseline clock offset; and identifying the transmitting ECU as compromised in response to detecting a sudden change in the differences between the accumulated clock offset and the baseline clock offset.

Clock offset may be determined by calculating a difference between an estimated arrival time for a given message and an actual arrival time for the given message. The baseline clock offset can be derived in part from messages from the transmitting ECU received by the recipient ECU prior to receiving the plurality of messages, for example using a recursive least squares method. In the context of recursive least square method, an identification error between the accumulated clock offset and the baseline clock offset is computed and the baseline clock offset is updated as a function of the identification error, where the identification error is a difference between the accumulated clock offset and a product of the baseline clock offset and the elapsed time for transmitting the plurality of messages.

In some embodiments, the sudden change between the accumulated clock offset and the baseline clock offset is determined using a cumulative sum method. More specifically, a limit for the identification error is computed as a function of a difference between the identification error and a mean of the identification error divided by variance of the identification error.

In yet another aspect, a non-transitory computer storage medium is associated with a recipient electronic control unit (ECU) in a vehicle network and stores instructions thereon. When executed by a processor, the instructions perform the steps of: receiving a plurality of messages from a transmitting ECU; determining clock offset for each message in the plurality of messages, where clock offset is determined in relation to a first message received from amongst the plurality of messages; determining an accumulated clock offset for the plurality of messages by summing the determined clock offsets together; computing a difference between the accumulated clock offset to a baseline clock offset; detecting a sudden change in difference between the accumulated clock offset and the baseline clock offset; and identifying the transmitting ECU as compromised in response to detecting a sudden change in the differences between the accumulated clock offset and the baseline clock offset.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A and 6B are graphs showing accumulated clock offsets and skew, respectively, derived by CIDS in the CAN bus prototype.

FIGS. 7A-7D are graphs showing an accumulated clock offset, identification error, and control limits outputted by CIDS, respectively, during a fabrication attack simulated on the CAN bus prototype.

FIGS. 7E-7H are graphs showing an accumulated clock offset, identification error, and control limits outputted by CIDS, respectively, during a fabrication attack simulated on the real vehicle.

FIGS. 8A-8C are graphs showing probability mass function of message intervals, changes in accumulated clock offsets, and control limits derived in CIDS, respectively, during a masquerade attack simulated on the CAN bus prototype.

Corresponding reference numerals indicate corresponding parts throughout the several views of the drawings.

DETAILED DESCRIPTION

Example embodiments will now be described more fully with reference to the accompanying drawings.

Figures 1, 2:
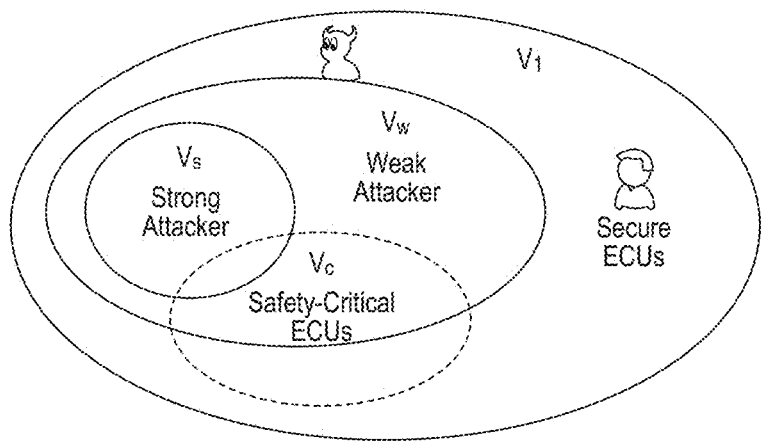
FIG. 1 illustrates the format of a CAN data frame.
FIG. 2 is a diagram showing various attackers in an in-vehicle network.

CAN is the most widely deployed in-vehicle communication protocol, which interconnects ECUs/nodes through a multi-master, message broadcast bus system. To maintain data consistency and make control decisions, data is exchanged between ECUs via CAN frames, the format of which is shown in FIG. 1. A CAN frame contains fields such as ID, Data Length Code (DLC), Data, and CRC. Since CAN is message-oriented, instead of containing the transmitter/receiver address, a CAN frame contains a unique ID which represents its priority and meaning. For example, a frame with ID=0x20 may contain wheel speed values whereas a frame with ID=0x55 may contain temperature values. While reference is made to CAN throughout this disclosure, it is readily understood that the broader aspects of this disclosure are applicable to other types of in-vehicle communication protocols.

Once the CAN bus is detected idle, nodes with buffered messages to transmit, attempt to access the bus. Multiple nodes could attempt to access the bus simultaneously, i.e., contention occurs for bus access. Such a contention is resolved via bus arbitration as follows. Each node first transmits the ID value of its CAN frame one bit at a time, starting with the most significant bit. Since CAN is designed to logically behave as a wired AND gate, some contending nodes see an output of zero from the bus, although they had transmitted a one. Such nodes withdraw from bus contention and switch to the receive mode. As a result, among the contending nodes, the ECU sending the message with the lowest ID value wins arbitration, and gains exclusive access for message transmission. Those which have lost arbitration re-attempt to transmit once the bus becomes idle again.

Each ECU broadcasts periodic (or occasionally sporadic) frames on the CAN bus to deliver retrieved sensor data. For proper bitwise transmission and reception, hard and soft bit synchronizations are achieved, respectively, by using the Start-of-Frame (SOF) signal and bit stuffing in CAN frames. Although these provide alignment of bit edges for message exchange, they do not synchronize the clocks of ECUs, i.e., CAN lacks clock synchronization. Thus, since time instants for ECUs are provided by their own quartz crystal clock, these clocks, in reality, run at different frequencies, resulting in random drifting of clocks: a drift of 2400 ms over a period of 24 hours is possible.

An adversary model, along with three representative attack scenarios, is now described. Adversaries can physically/remotely compromise more than one in-vehicle ECU through numerous attack surfaces and means. We consider an adversary who wants to manipulate a safety-critical ECU. An ECU is said to be manipulated if the adversary injects a message with the same ID as the one originally sent by that ECU, and such an ID is called a manipulated ID. Such an arbitrary message from the adversary is called an attack message. An ECU can be manipulated either by directly compromising that ECU or by compromising some other ECU and injecting attack messages through it. In other words, a manipulated ECU may or may not be a compromised ECU. Depending on the attack surface, network architecture, and hardware/software, ECUs of different vehicles, if compromised, have different degrees of vulnerabilities, and thus attack capabilities. Consider two different types of compromised nodes: strong and weak attackers.

A weak attacker is a compromised ECU of which the installed malicious software has a limited control. Due to the restrictions (e.g., hardware/software specification, attack surfaces) of the compromised ECU, the weak attacker neither has access to data in RAM or FLASH (e.g., shared secret keys) nor can inject any fabricated messages. So, the weak attacker can only stop the ECU from transmitting certain messages or keep the ECU in listen-only mode.

A strong attacker is also a compromised ECU which has not only full control of the node but also access to memory data. Thus, in addition to what a weak attacker can do, a strong attacker is also capable of mounting attacks by injecting fabricated/modified messages. Even when security mechanisms (e.g., cryptographic message authentication) are built into the ECUs, since the strong attacker has access to the stored secrets, one can disable the security solutions and inject forged messages. In contrast, a weak attacker can only stop or listen to message transmissions, but cannot start a new one.

To comprehend how and why these two different types of attackers can exist, let's consider the most common CAN controller, Microchip MCP2515. For ECUs with such a controller, various operation modes like configuration, normal, and listen-only can be selected by user instructions through the Serial Peripheral Interface (SPI). Thus, user-level features for configuring the CAN controller allow attackers to easily enter different modes (e.g., listen-only mode for a weak attacker). In contrast, there are no such provided features allowing attackers to easily inject forged messages. In other words, the specification of the ECU hardware/software, if compromised, can restrict the adversary to become a weak attacker only. Note that the required functionalities of a strong attacker—i.e., monitor, stop, and start message transmissions—subsume those of a weak attacker. It is thus easier for an adversary to become a weak attacker than a strong attacker, let alone researchers have already demonstrated how to create such a strong attacker.

Referring to FIG. 2, consider an in-vehicle network which is composed of a set, $V_I$ of ECUs. Only a subset of ECUs in $V_I$ are vulnerable and can thus be compromised by the adversary to become strong/weak attackers. Let $V_W$ be the set of ECUs that are vulnerable to be weak attackers and $V_S$ to be strong attackers. Since compromising an ECU as a strong attacker is more difficult than making it a weak attacker, assume $V_S$, $V_W \neq \emptyset$ and $|V_S| \ll |V_W|$. Moreover, since strong attackers are simply those with more functionalities than the weak attackers, $V_S \subset V_W \subset V_I$. Of the set of all ECUs, define a set $V_C$ of safety-critical (e.g., brake, steering, engine control) ECUs. Compromising or manipulating such ECUs can critically undermine vehicle operation and thus be the adversary's main target of attack. However, due to their safety-critical nature, they usually have less attack surfaces and vulnerabilities than on-safety-critical ECUs. Thus, only a few ECUs would be vulnerable to be compromised as weak attackers, and even fewer ECUs as strong attackers.

Based on the adversary model discussed so far, consider only attacks that can severely impair in-vehicle functions. Less severe attacks are not considered, such as those that require only weak attackers (e.g., eavesdropping), as they do not harm the vehicle itself. In general, the attacks which can impair in-vehicle functions are in the form of fabrication, modification, and masquerade.

Figure 3A:
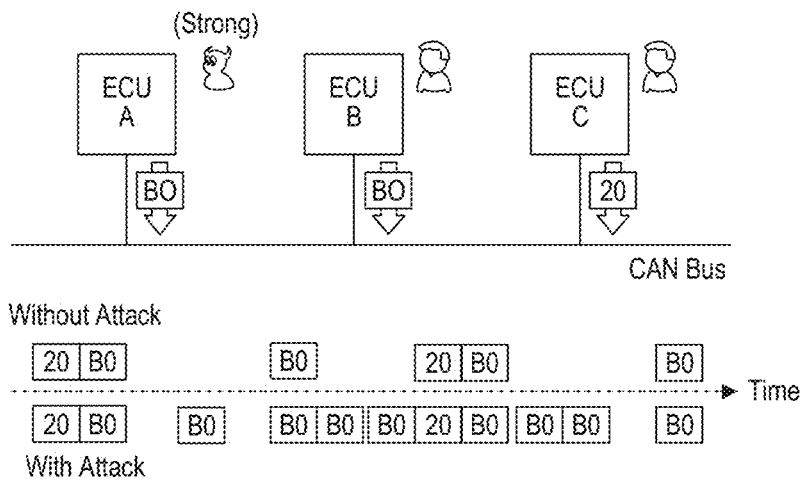
FIG. 3A is a diagram depicting a fabrication attack.

Through an in-vehicle ECU compromised to be a strong attacker, the adversary fabricates and injects messages with forged ID, DLC, and data on the bus. The objective of this attack is to override any periodic messages sent by a legitimate/uncompromised safety-critical ECU so that their receiver ECUs get distracted or become inoperable. For example, as shown in FIG. 3A, the strong attacker A injects several attack messages with ID=0xB0, which is usually sent by a legitimate ECU B, at a high frequency. Thus, other nodes which normally receive message 0xB0 are forced to receive the fabricated attack messages more often than the legitimate ones, i.e., 0xB0 messages sent by B are overridden. Such a case is referred to as A mounting a fabrication attack on message 0xB0 or its genuine transmitter B. In this example, A is the compromised ECU, B is the manipulated ECU, and 0xB0 is the manipulated ID. Demonstrated attacks such as stopping a Jeep Cherokee, controlling vehicle maneuver, and monopolizing the CAN bus with highest priority messages exemplify a fabrication attack.

Figure 3B:
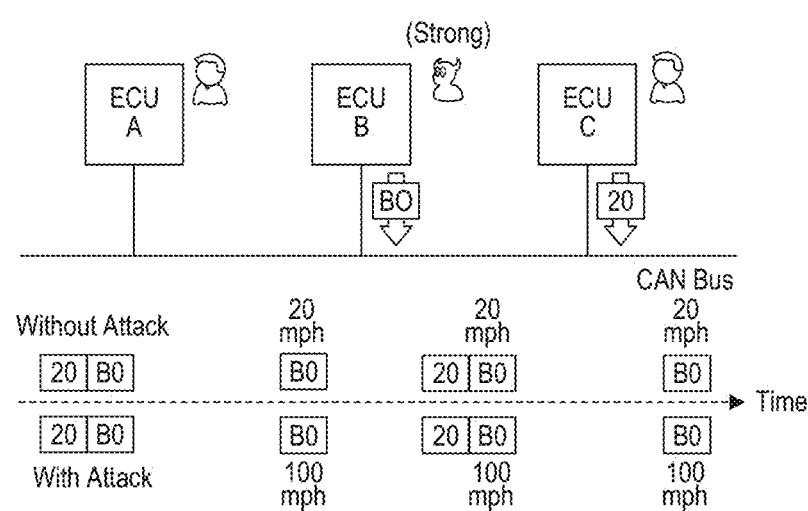
FIG. 3B is a diagram depicting a modification attack.

Similar to the fabrication attack, the adversary acts as a strong attacker. Normally, ECUs read their sensors and load the read values in the message data field for transmission, along with a specified DLC. However, as shown in FIG. 3B, rather than attempting to override others' message, the adversary modifies the DLC/data value before sending the message, e.g., the adversary loads a speed value of 100 mph in message 0xB0, although it should have been 20 mph. This differs from the fabrication attack in that the adversary is only modifying the values loaded in its message without changing the message's frequency and origin. In this example, ECU B is both compromised and manipulated. Changing the reported wheel speed sensor readings via an attacker hardware exemplifies a modification attack.

Figure 3C:
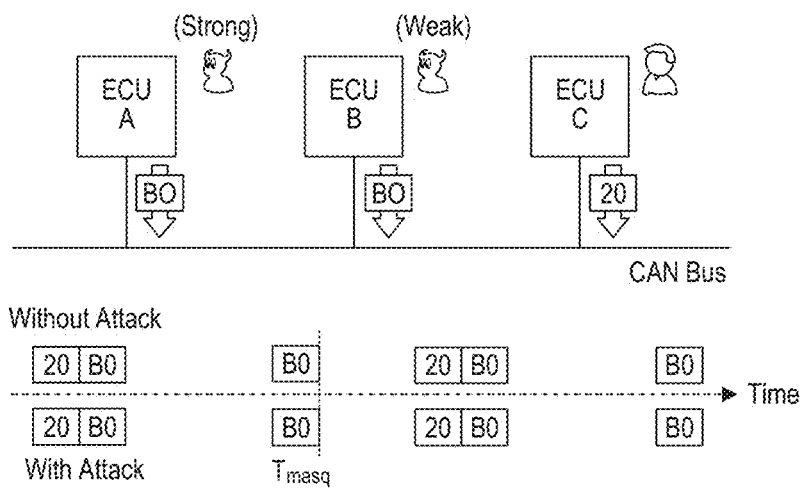
FIG. 3C is a diagram depicting a masquerade attack.

To mount a masquerade attack, the adversary needs to compromise two ECUs, one as a strong attacker and the other as a weak attacker. FIG. 3C shows an example where the adversary has control of a strong attacker A and a weak attacker B. Until time $T_{masq}$, the adversary monitors and learns which messages are sent at what frequency by its weaker attacker, e.g., B sends message 0xB0 every 20 ms. Since most in-vehicle network messages are periodic and broadcast over CAN, it is easy to learn their IDs and intervals. Once it has learned the ID and frequency of a message, at time $T_{masq}$, the adversary stops the transmission of its weak attacker and utilizes its strong attacker A to fabricate and inject attack messages with ID=0xB0. Stopping B's transmission and exploiting A for transmission of attack messages are to overcome the weak attacker's inability of injecting messages. After $T_{masq}$, the original transmitter of 0xB0, B, does not send that message any longer, whereas A sends it instead at its original frequency. So, when the CAN bus traffic is observed, the frequency of message 0xB0 remains the same, whereas its transmitter has changed. Such a case is referred to as A mounting a masquerade attack on message 0xB0 or its original transmitter B. In this example, A and B are compromised, B is manipulated, and 0xB0 is the manipulated ID.

Through a masquerade attack, the adversary can inject arbitrary messages from the compromised/impersonating ECU. Such "change of the message transmitter" can lead to severe consequences in CAN: priority inversion and message sequence change. An impersonating ECU sending a message instead of another ECU implies that it would have more messages to transmit than before, making its transmission buffer more likely overloaded. This may, in turn, cause severe problems such as non-abortable message transmissions and significant priority inversion. Such problems have been identified to be critical since they degrade the real-time performance of CAN significantly, and thus undermine drivers/passengers' safety. Moreover, the original sequence of messages may change as well, thus failing to meet the requirement of some in-vehicle messages to be sent sequentially in a correct order for proper vehicle operations. The masquerade attack can therefore cause a very severe problem in in-vehicle networks.

Building an efficient anomaly-based IDS requires not only an analysis of how to model the norm behavior but also an understanding of possible threats. Thus, three representative attack scenarios are analyzed and compared in terms of detectability, severity, and viability. For the in-vehicle network under consideration in FIG. 2, first determine the sets of ECUs that can be compromised or manipulated through the three attack scenarios. Once an adversary compromises an ECU$\in V_S$ as a strong attacker, he can manipulate any safety-critical an ECU$\in V_C$ via a fabrication attack. To mount a modification attack for manipulation of a safety-critical ECU, the adversary has to compromise the safety-critical ECU as a strong attacker, i.e., compromise an ECU$\in V_S \cap V_C$. Since the attack can only be mounted on messages which the compromised ECU originally sends (i.e., manipulate only the compromised ECU), the manipulated ECU$\in V_S \cap V_C$. Lastly, to mount a masquerade attack on a safety-critical ECU, two compromised ECUs are required: one strong and one weak attacker with the latter being a safety-critical ECU. That is, the adversary should compromise not only an ECU $\mathbb{X} \in V_S$ but also an ECU $\mathbb{Y} \in V_W \cap V_C$. Then, the adversary can manipulate the safety-critical ECU $\mathbb{Y}$ via message injections from $\mathbb{X}$.

When attempting to manipulate a safety-critical ECU via the three different attack scenarios, the scenarios are compared in terms of the following factors.

F1. Detectability—measures how easily the attack can be detected and eradicated via state-of-the-art IDSs.

F2. Condition—specifies the set of ECUs that the adversary should compromise to satisfy the attack conditions, i.e., the required number/type of attackers.

F3. Attack space—is the set of safety-critical ECUs that can be manipulated, once the condition is satisfied.

F1—Detectability. When a fabrication attack is mounted, the frequency of certain messages significantly and abnormally increases. Thus, if state-of-the-art IDSs, which monitor the message frequencies, were to be used, the attack can easily be detected. In case of a modification attack, existing IDSs—which exploit the fact that changes in some in-vehicle data values are predictable—can detect attacks on them. However, since not all values are predictable, not all modification attacks are detectable by existing IDSs. In general, this makes the modification attack more difficult to detect than fabrication attack. To mount a masquerade attack, the adversary does not change the original frequency of messages and may not change their values either. Thus, using this attack, the adversary can evade state-of-the-art IDSs. Since it is easy to detect the fabrication attack via existing IDSs while it is not for others, this disclosure will focus on comparison of modification and masquerade attacks.

F2—Condition. The masquerade attack requires a compromised ECU$\in V_S$ and another ECU$\in V_W \cap V_C$, whereas the modification attack only requires one ECU$\in V_S \cap V_C$. Although this may be a drawback of the masquerade attack, it is more practical and severe than modification attack for the following reasons.

1. $V_S \cap V_C$ implies $V_S$ and $V_W \cap V_C$, but not vice versa—if $V_S \cap V_C \neq \emptyset$, then $V_S \neq \emptyset$ and $V_W \cap V_C \neq \emptyset$. In other words, if the condition of a modification attack can be met for a given in-vehicle network, so can the conditions of a masquerade attack. Moreover, even when $V_S \cap V_C = \emptyset$, $V_S$ and $V_W \cap V_C$ can both still be non-empty sets, i.e., the masquerade attack is still possible even though the modification attack is not.

2. $P(V_S \cap V_C = \emptyset) \gg P(V_W \cap V_C = \emptyset)$—As discussed earlier, safety critical ECUs are likely to have less attack surfaces and vulnerabilities than on-safety-critical ones. So, the probability of $V_S \cap V_C = \emptyset$ can be very high, i.e., making the modification attack infeasible. On the other hand, the probability of $V_W \cap V_C = \emptyset$ would be lower than that, since $\{V_S \cap V_C\} \subset \{V_W \cap V_C\}$, i.e., the masquerade attack is easier to mount that the modification attack.

As a result, there exist too many restrictions for the adversary to achieve its goal via the modification attack, compared to the masquerade attack.

F3—Attack space. Since $\{V_S \cap V_C\} \subset \{V_W \cap V_C\}$, the masquerade attack has a wider range of safety-critical ECUs, which it can manipulate, than the modification attack, thus making it more harmful.

Table 1 below summarizes the comparison of the three attack scenarios with respect to F1-F3.

TABLE 1

|  | Fabrication | Modification | Masquerade |
| --- | --- | --- | --- |
| Detectability | High | Medium | Low |
| Condition | $V_S$ | $V_S \cap V_C$ | $V_S, V_W \cap V_C$ |
| Attack Space | $V_C$ | $V_S \cap V_C$ | $V_W \cap V_C$ |

In addition to F1-F3, the following aspect of the masquerade attack makes its detection imperative. When mounting it, if the adversary does not change the content and frequency of messages—assuming priority inversion or message sequence change do not incur—it can behave like a legitimate ECU, which until then does no harm to the in-vehicle network. However, the adversary may later mount other types of attacks (e.g., a fabrication attack) through the impersonating ECU. Hence, defending against the masquerade attack implies not only detecting the attack reactively, but also preventing other attacks proactively. Thus, considering such a fact along with the analysis results, the focus is on building an IDS that can detect both masquerade and fabrication attacks. In this work, the modification attack is not considered in building a new IDS since not only it is less practical but also it can be addressed by existing IDSs or proposed approaches for vehicle fault detection.

Although state-of-the-art IDSs are capable of detecting some basic attacks such as fabrication and interruption attacks, they fail to detect more sophisticated ones such as the masquerade attack for the following reasons. First, no authenticity—CAN messages lack information on their transmitters. So, existing IDSs do not know whether or not the messages on the CAN bus were sent by the genuine transmitter, and hence cannot detect change of the message transmitter. Second, the inability of identifying a compromised ECU. Lack of the transmitter's information makes it very difficult or impossible for state-of-the-art IDSs to identify which ECU was compromised and used for mounting an attack. If CAN frames do not carry any information on their transmitters, how could an IDS identify them and detect intrusions such as the masquerade attacks? Which behavior of CAN should the IDS model for detection of such intrusions? These questions are answered by developing a novel IDS, CIDS, which exploits message frequency to fingerprint the transmitter ECUs, and models a norm behavior based on their fingerprints for detection of intrusions.

For each in-vehicle ECU, the time instants of periodic message transmissions are determined by its quartz crystal clock. We follow the nomenclature of clocks of the NTP specification. Let $\mathbb{C}_{true}$ be a "true" clock which reports the true time at any moment and $\mathbb{C}_i$ be some other non-true clock. Define the terms "clock offset, frequency, and skew" as follows.

Offset: difference in the time reported by clock $\mathbb{C}_i$ and the true clock $\mathbb{C}_{true}$. Define relative offset as the offset between two non-true clocks.

Frequency: the rate at which clock $\mathbb{C}_i$ advances. Thus, the frequency at time t is $\mathbb{C}'_i(t) \partial d \mathbb{C}_i(t)/dt$.

Skew: difference between the frequencies of clock $\mathbb{C}_i$ and the true clock $\mathbb{C}_{true}$. Define relative skew as the difference in skews of two non-true clocks.

If two clocks have relative offset and skew of 0, then they are said to be synchronized; otherwise, they are considered unsynchronized. Since CAN lacks clock synchronization, it is considered to be unsynchronized The clock offsets and skews of unsynchronized nodes depend solely on their local clocks, thus being distinct from others. Various studies have exploited this fact to fingerprint physical devices. However, they are not applicable to this problem as they exclusively rely on the timestamps carried in the packet headers, which are not available in in-vehicle networks. To build an efficient/effective IDS, which can detect various types of attack including the masquerade attack, it should be capable of verifying the transmitter of each message. However, since such information is not present in CAN messages, one must fingerprint ECUs with other "leaked" information. Unlike the existing approaches that exploit embedded timestamps, this disclosure exploits message periodicity to extract and estimate the transmitters' clock skews, which are then used to fingerprint the transmitter ECUs.

Figure 4:
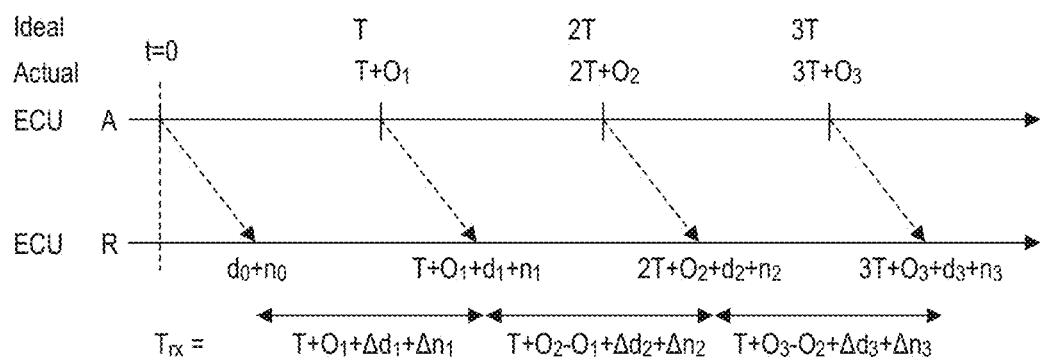
FIG. 4 is a diagram showing timing analysis of message arrivals in a vehicle network.

Consider an ECU $\mathbb{A}$ which broadcasts a message every T ms and an ECU $\mathbb{R}$ which periodically receives that message. From the perspective of $\mathbb{R}$, since only its timestamp (without any timestamp information from the transmitter) is available, consider its clock as the true clock. As shown in FIG. 4, due to the clock skew, periodic messages are sent at times with small offsets from the ideal values (e.g., T, 2T, 3T, ...). Let t=0 be the time when the first message was sent from $\mathbb{A}$, and $O_i$ be the clock offset of $\mathbb{A}$ when it sends the i-th message since t=0. Then, after a network delay of $d_i$, ECU $\mathbb{R}$ would receive that message and put an arrival timestamp of $iT+O_i+d_i+n_1$, where $n_i$ denotes the noise in $\mathbb{R}$'s timestamp quantization. Thus, the intervals between each arrival timestamp $T_{rx,i}=T+\Delta O_i+\Delta d_i+\Delta n_i$, where $\Delta X_i$ denotes the difference of X between step i and i-1, and $O_0=0$. Since the change in $O_i$ within one time step is negligible and $n_i$ is a zero-mean Gaussian noise term, the expected value of the timestamp intervals, $u_{T_{rx}}=E[T_{rx,i}]$ can be expressed as:

$$\mu_{T_{rx}}=E[T\Delta O_i+\Delta d_i+\Delta n_i]=T+E[\Delta O_i+\Delta d_i+\Delta n_i]\approx T, \quad (1)$$

where the second equality holds since T is a predetermined constant. Since the data lengths of CAN periodic messages, i.e., DLC's are constant over time, for now, consider $E[\Delta d_i]=0$. Later, this disclosure will consider the case when $d_i$ is not constant, and how it may affect the performance of CIS.

Figure 5:
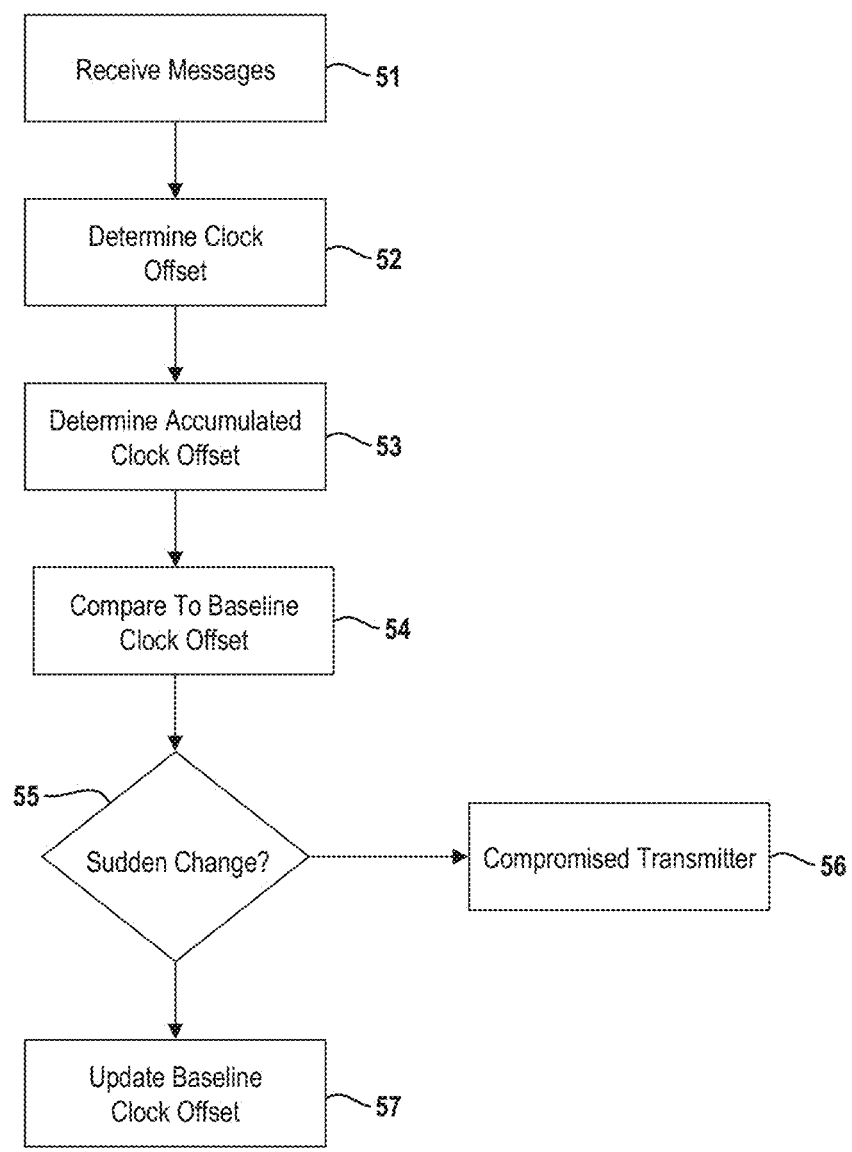
FIG. 5 is a flowchart depicting a method for detecting a compromised ECU by another ECU in a vehicle network.

FIG. 5 depicts an example method for detecting a compromised ECU in a vehicle network by a recipient ECU (i.e., ECU $\mathbb{R}$). In this method, the recipient ECU receives messages at 51 via the vehicle network from one or more transmitting ECUs. Messages may be grouped and assigned as being from a given transmitting ECU using a message identifier contained in each message. It is noted that the messages do not include any timestamp or timestamp information from the transmitting ECU.

From the messages received from the transmitting ECU, a clock skew can be determined for the transmitting ECU. For each message, a clock offset is first determined at 52, where the clock offset is determined in relation to a first message received from amongst the plurality of messages. Based on the arrival timestamp of the first message, $d_0+n_o$, and the average of timestamp intervals, $u_{T_{rx}}$, extrapolate and determine the estimated arrival time of the i-th message as $i\mu_{T_{rx}}+d_0+n_o$, whereas the actual measured arrival time is $iT+O_i+d_i+n_i$. Because one is estimating subsequent arrival times, $\mu_{T_{rx}}$ is determined by past measurements. Since T is constant over time and thus again $u_{T_{rx}}\approx T$, the average difference between the estimated and measured times is:

$$E[\mathbb{D}]=E[T-u_{t_{rx}})+O_i+\Delta d+\Delta n]\approx E[O_i] \quad (2)$$

In other words, from the periodicity of the message, one can estimate the average clock offset, $E[O_i]$, which will indeed be distinct for different transmitters. Since clock offset is slowly varying and non-zero, $[O_i]\neq 0$, whereas $E[\Delta O_i]=0$.

If ECU $\mathbb{R}$ were to determine the average clock offset for every N received messages, since it is derived in reference to the first message (of N messages), it represents only the average of newly incurred offset. Thus, to obtain the total amount of incurred offset, which is called the accumulated clock offset, the absolute values of the average clock offsets have to be summed up as indicated at 53. By definition, the slope of the accumulated clock offset would thus represent the clock skew, which is constant as will be shown. This enables CIDS to estimate the clock skew from arrival timestamps and thus fingerprint a given message transmitter for intrusion detection. It will be shown later, via experimental evaluations on a CAN bus prototype and on a real vehicle, that the thus-derived clock skew is indeed a fingerprint of an in-vehicle ECU.

Once fingerprinted using clock skew, any sudden or abnormal change in clock skew would indicate an intrusion. A change in the clock skew for the transmitting ECU can be determined by comparing the clock skew for the transmitting ECU to a baseline value for the clock skew of the transmitting ECU. In an example embodiment, the baseline value for clock skew is derived from other messages transmitted by the transmitting ECU and received by the recipient ECU, for example messages received prior to the receipt of the contemporaneous messages used to compute current clock skew. Other ways for deriving a baseline value for clock skew are also contemplated by this disclosure.

In the example embodiment, the baseline value for the clock skew of the transmitting ECU is derived using linear regression. For a given message ID, CIDS derives the accumulated clock offset inherent in the arrival timestamps. Since clock skew is constant, the accumulated clock offset is linear in time, and hence CIDS describes it as a linear regression model. A linear parameter identification problem is thus formulated as:

$$O_{acc}[k]=S[k]\cdot t[k]+e[k], \quad (3)$$

where at step k, $o_{acc}[k]$ is the accumulated clock offset, S[k] the regression parameter, t[k] the elapsed time, and e[k] the identification error. The regression parameter S represents the slope of the linear model and thus the estimated clock skew. The identification error, e, represents the residual which is not explained by the model. In CIDS, $o_{acc}$, S and e are updated every N messages, i.e., kN messages are examined up to step $\mathcal{K}$. Thus, in an example embodiment, the Recursive Least Squares (RLS) algorithm is used to determine the unknown parameter S. This approach uses the residual as an objective function to minimize the sum of squares of the modeling errors. Hence, in a Recursive Least Square approach, the identification error skews towards 0, i.e., has 0 mean.

More specifically, the accumulated clock offset is determined from arrival timestamps of a given message ID. Then, based on the derived identification error, the gain, G, and the covariance, P, are updated with RLS for identifying the regression parameter S, i.e., estimate clock skew. This procedure of clock skew estimation continues iteratively during the operation of CIDS and, if uncompromised, outputs an identification error skewed towards 0 and a constant clock skew. This way, the norm clock behavior of the transmitter can be described as a linear model with the clock skew being the slope. In RLS, a forgetting factor, λ, is used to give exponentially less weights to older samples and thus provide freshness. In the example embodiment, is set to 0.9995 although other values can also be used.

To estimate clock skew, one can also use algorithms other than RLS, such as Total Least Squares (TLS) and Damped Least Squares (DLS), which perform orthogonal linear and non-linear regression, respectively. Although they might identify the clock skew with a higher accuracy than RLS, their gains are offset by the accompanying high complexity. For example, TLS requires Singular Value Decomposition (SVD), which is computationally expensive, and DLS requires a large number of iterations for curve fitting. RLS is known to have a computation complexity of $\mathcal{O}(N^2)$ per iteration, where N is the size of the data matrix. However, in CIDS, only a scalar clock offset is exploited for identification, and thus the computational complexity is relatively low.

Detecting an intrusion using clock skew can be accomplished in different ways. For a given message ID, CIDS runs RLS for clock skew estimation, constructs a norm model on clock behavior, and verifies whether there are any abnormal measurements deviating from it, i.e., intrusions. That is, an intrusion is identified in response to detecting a sudden change in the clock skew of the transmitting ECU.

Consider a fabrication attack in which the adversary injects an attack message with ID=0x01, which is originally sent every 10 ms by some ECU. Since the fabrication attack significantly decreases the average timestamp intervals of 0x01, the average clock offset increases. As a result, due to a sudden increase in the rate at which the accumulated clock offset changes, a high identification error results. Similarly, when a masquerade attack is mounted, since the adversary sends the message through a different ECU than its original one, the increase rate of accumulated clock offset, i.e., clock skew, suddenly changes and also results in a high identification error. In summary, unlike when the mean of identification error should usually skew towards 0, which is the norm clock behavior, its mean suddenly shifts towards a high non-zero value when there is an intrusion.

In the example embodiment, CIDS exploits the Cumulative Sum (CUSUM) method, which derives the cumulative sums of the deviations from a target value to detect sudden shifts in clock skew. Since it is cumulative, even minor drifting from the target value leads to steadily increasing or decreasing cumulative values. It is therefore optimal in detecting small persistent changes and is widely used for change-point detection. CIDS detects intrusions via CUSUM as follows. At each step of clock skew estimation, CIDS updates the mean and variance of the identification errors (e), $\mu_e$ and $\sigma_e^2$, respectively. In CIDS, these values represent the CUSUM target values of e (i.e., norm clock behavior), and thus require proper tracking. Hence, as a precaution of abnormal values incurring from an attack to be reflected into the target values, $M_E$ and $\sigma_e^2$ are updated only if $$\left| \frac{e - \mu_e}{\sigma_e} \right| < 3.$$

Then, per derived identification error e, the upper and lower control limits of CUSUM, $L^+$ and $L^-$ are updated as:

$$L^+ \leftarrow \max[0, L^+ + (e-\mu_e)/\sigma_e - \kappa] \quad (4)$$

$$L^- \leftarrow \max[0, L^- - (e-\mu_e)/\sigma_e - \kappa] \quad (5)$$

where $\mathcal{K}$ is a parameter reflecting the number of standard deviations CIDS intends to detect. In this way, the baseline value for clock skew can be updated as indicated at step 57. Note that $\mathcal{K}$ can be learned offline or by monitoring normal in-vehicle traffic.

Upon detecting a sudden change in clock skew at 55, the transmitted ECU can be designated as compromised as indicated at step 56. In the example embodiment, the control limits of CUSUM are used to detect sudden change. If either of the control limits, $L^+$ or $L^-$, exceeds a threshold, $\Gamma_L$, a sudden positive or negative shift in value has been detected, respectively, and thus CIDS declares it as an intrusion. In the example embodiment, $\Gamma_L$ is set to 5 although other values may be used as well. In response to detecting a sudden change in the clock skew, the recipient ECU and/or the vehicle may take one or more protective actions. For example, the transmitting ECU may be disabled in response to detecting a sudden change in the clock skew for the transmitting ECU. In another example, the driver of the vehicle may be advised to stop the vehicle. Other types of protective actions may be taken and fall within the broader scope of this disclosure.

The example algorithm described above is summarized as follows.

| Algorithm-Clock skew estimation with RLS |
|---|
| 1: Initialize: S[0] = 0, p[0] = δI |
| 2: function SKEWUPDATE(t,e)   ▷RLS algorithm |
| 3: $\quad G[k] \leftarrow \dfrac{\lambda^{-1}P[k-1]t[k]}{1+\lambda^{-1}t^2[k]P[k-1]}$ |
| 4: $\quad P[k] \leftarrow \lambda^{-1}(P[k-1] - G[k]t[k]P[k-1])$ |

| Algorithm-Clock skew estimation with RLS |
| --- |
| 5:     $S[k] \leftarrow S[k-1] + G[k]e[k]$ |
| 6:     return $S[k]$ |
| 7:     end function |
| 8:     for $k^{th}$ step do |
| 9:         $a_1, \ldots, a_N$ ←arrival timestamps of N messages |
| 10:    $T_1 \ldots, T_{N-1}$ ← timestamp intervals |
| 11:    $\mu_T[k] \leftarrow \frac{1}{N-1}\sum_{i=1}^{N-1} T_i$   ▷Avg. timestamp interval |
| 12:    $O[k] \leftarrow \frac{1}{N-1}\sum_{i=2}^{N} a_i - (a_1 + (i-1)\mu_T[k-1])$ |
| 13:    $O_{acc}[k] \leftarrow O_{acc}[k-1] + |O[k]|$   ▷Accumulated offset |
| 14:    $e[k] \leftarrow O_{acc}[k] - S[k-1]t[k]$   ▷Identification error |
| 15:    $S[k] \leftarrow$ SKEWUPDATE(t,e)   ▷Clock skew |
| 16:    end for |

The above algorithm is presented only to describe one particular embodiment that has proven effective and should be viewed as illustrating, rather than limiting, the present invention.

In addition to per-message detection, CIDS also alarms intrusions via message-pairwise detection, which examines the correlation between the average clock offsets in two periodic messages. Consider two messages $M_1$ and $M_2$ periodically sent by an ECU $\mathbb{A}$. Since these messages originate from the same transmitter, their instantaneous average clock offsets are likely equivalent. Thus, the correlation coefficient, $\rho$, between their average clock offsets (derived per step) would show a high value close to 1, i.e., correlated. On the other hand, if the two messages were sent by different ECUs, $\rho \approx 0$, i.e., uncorrelated.

If clock offsets in two messages are highly correlated, ($\rho > 0.8$), their relationship can be linear. So, CIDS describes them as a linear regression model: $O_{M_2}[k] = \alpha O_{M_1}[k] + e_{corr}[k]$, where $O_{M_1}$ denotes the average clock offset of message $M_1$ at step k, a the regression parameter, and $e_{corr}[k]$ the identification error. As per-message detection, message-pairwise detection is also based on a linear model. Thus, apply the same detection method, CUSUM. Since message-pairwise detection seeks intrusions from a different perspective than per-message detection, it reduces false positive/negative results. Note, however, that message-pairwise detection is only applicable when two messages' clock offsets are highly correlated, whereas per-message detection is applicable to any periodic message. Moreover, albeit effective, it requires pairwise computations. Therefore, message-pairwise detection can be used as an optional feature of CIDS. Later it is shown via experimental evaluations how message-pairwise detection further improves the performance of CIDS.

To reduce possible false positives/negatives, CIDS also performs a verification process. Suppose that a possible intrusion was alarmed due to a high identification error when verifying message $V_i$, the i-th message of V. Although such a high error can be due to an intrusion, it can also be due to an incorrect computation of average clock offset. Considering $E[\Delta d_i]=0$ and could thus extract and determine the average clock offset. Although this is true in most cases, occasionally, $E[\Delta d_i] \neq 0$, which affects the accuracy of deriving the true clock offset and thus the detection result. In CAN, $E[\Delta d_i] \neq 0$ only occurs if the transmission of $V_i$ was delayed due to the bus being busy or its transmitter losing arbitration when attempting to send $V_i$. Note that the latter also results in the bus being busy before the transmission/reception of $V_i$. Thus, CIDS also checks if the possibility of $E[\Delta d_i] \neq 0$ is the main cause of a (possibly false) alarm of intrusion by verifying whether the CAN bus was busy right before receiving $V_i$. This way, CIDS enhances its detection accuracy. However, as discussed before, usually $E[\Delta d_i]=0$ in an actual CAN bus due to its high speed, its messages have short lengths, and low bus load. In other words, the nature of CAN bus communication helps CIDS reduce false positives/negatives.

When an intrusion is detected for some message ID, CIDS can also identify which compromised ECU mounted the attack. It can extract the clock skew for that attacked message ID, compare it with other clock skew values extracted from other message IDs, and exploit the comparison result in determining whether they originated from the same transmitter. This way, CIDS can at least reduce the scope of ECUs which may (or may not) have mounted the attack, thus facilitating a root-cause analysis. However, one limitation for CIDS in achieving this would be that since it can only extract clock skews from periodic messages, it would be difficult to identify the root-cause of attacks launched on aperiodic messages.

An evaluation of the performance of CIDS on a CAN bus prototype and a real vehicle is described below. A bus prototype was built with 3 CAN nodes, each of which consists of an Arduino UNO board and a SeeedStudio CAN shield. The CAN bus shield consists of a Microchip MCP2515 CAN controller, MCP2551 CAN transceiver, and a 120Ω terminal resistor to provide CAN bus communication capabilities. This prototype operates at a 500 kbps bus speed as in typical CAN buses. The first node $\mathbb{A}$ was programmed to send messages 0x11 and 0x13 every 50 ms, and the second node $\mathbb{B}$ to send message 0x55 at the same frequency. The third node was programmed to run CIDS.

A 2013 Honda Accord was also used for experiments in an isolated and controlled (for safety) environment. Via the On-Board Diagnostic (OBD-II) system port, the CAN bus prototype nodes—which function as an adversary or CIDS—were connected to the in-vehicle network. Through the OBD-II port, the three nodes were able to communicate with real ECUs. In order to identify which messages originate from the same real ECU and thus exploit it as a reference, a naïve method was used as described "Understanding and using the controller area network communication protocol: Theory and practice" by M. D. Natale et al. The messages, which originate from the same ECU and have the same preset message interval, were shown to have the same number of transmissions on the bus, when traced for at least a few minutes. Such a method can be an alternative to fingerprinting, but it requires pairwise comparisons and cannot be completed in real time as required in CIDS, which is essential for intrusion detection in in-vehicle networks.

While running CIDS, offsets and skews were determined for every 20 received samples, i.e., N=20, and set $\mathcal{K}$ =5. For the evaluation of CID's performance in defending against in-vehicle network attacks, consider fabrication and masquerade attacks, but omit the modification attack for the reasons discussed earlier.

First, evaluate the validity of CIDS's fingerprinting of the transmitters based on the estimated clock skews. Skew estimates are evaluated in microseconds per second (μs/s) or parts per million (ppm).

Figures 6C, 6D:
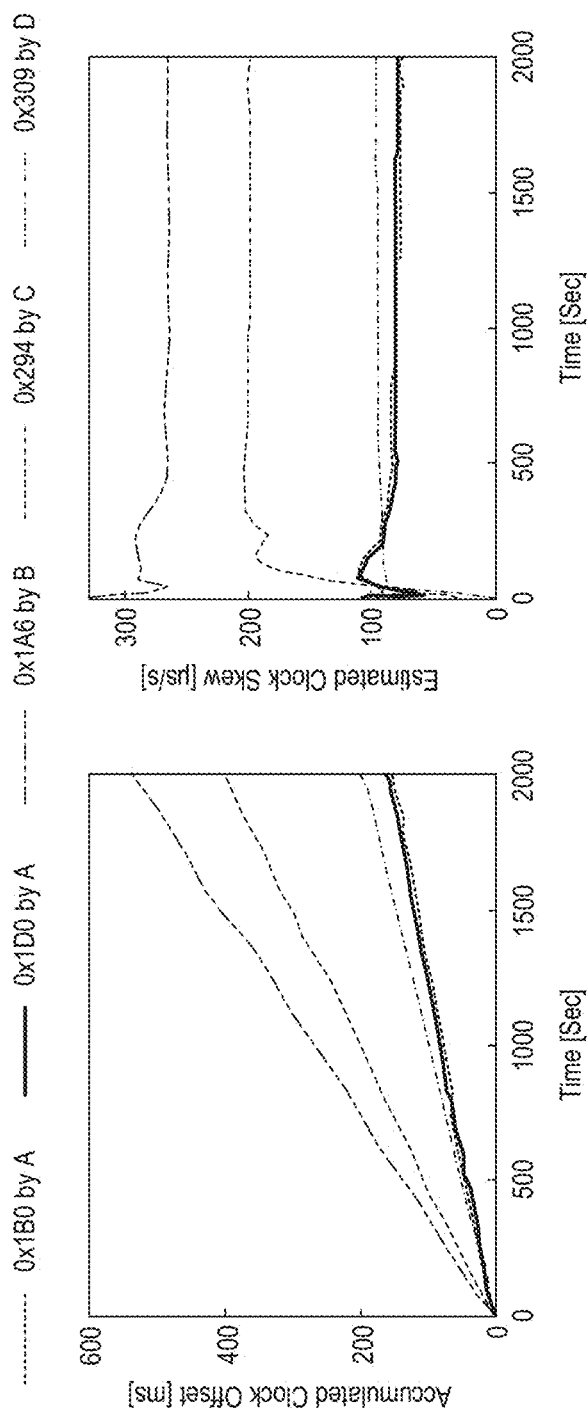
FIGS. 6C and 6D are graphs showing accumulated clock offsets and skews, respectively, derived by CIDS on the real vehicle.

FIG. 6A plots the evaluation results of CIDS's fingerprinting on the CAN bus prototype; accumulated clock offsets and the estimated clock skews of messages 0x11, 0x13, and 0x55. All the derived accumulated clock offsets are found to be linear in time, i.e., constant estimated skews. Messages 0x11 and 0x13, both of which were sent from node A, exhibited the same constant clock skew of 13.4 ppm. On the other hand, the message 0x55 sent from a different node 𝔹 showed a different clock skew of 27.2 ppm. Thus, the clock skews derived by CIDS can be used to differential ECUs.

For CIDS's evaluation on a real vehicle, the CAN prototype nodes logged the in-vehicle CAN traffic, and ran CIDS on messages 0x1B0, 0x1D0, 0x1A6, 0x294, and 0x309. The approach was adopted to verify that messages 0x1B0 and 0x1D0 were sent from the same ECU, whereas others were sent from different ECUs. Utilizing these facts, one can conclude from FIG. 6B that the clock offsets and the skews derived in CIDS are equivalent only for those messages sent from the same ECU; only 0x1B0 and 0x1D0 showed a skew of 78.4 ppm, while messages 0x1A6, 0x294, and 0)(309 showed very different skews of 265.7 ppm, 199.8 ppm, and 95.78 ppm, respectively. This result again shows that clock skews between different ECUs are distinct and can thus be used as the fingerprints of the corresponding ECUs.

Under the CAN bus prototype and real vehicle settings, a fabrication attack was launched and CIDS's effectiveness in detecting it evaluated. To this end, consider CIDS to only perform per-message detection, and will later evaluate CIDS with message-pairwise detection.

For evaluation of CIDS on the CAN bus prototype, 𝔹 was programmed to inject a fabricated message at t=400 secs with ID=0x11, which is a periodic message usually sent by 𝔸, i.e., 𝔹 launches a fabrication attack on 𝔸. ECU ℝ was running CIDS on message 0x11 and derived accumulated clock 11: offset ($O_{acc}$), identification error (e), and control limits ($L^+$, $L^-$). FIG. 7A shows how such values changed for message 0x11 in the presence and absence of an attack. As soon as 𝔹 mounted a fabrication attack, there was a sudden positive shift in the accumulated clock offset, thus yielding a high identification error. Due to such a shift, the upper control limit, $L^+$ of CUSUM suddenly increased and exceeded its threshold $\Gamma_L$=5, i.e., detecting an intrusion. Since the sudden shift in e was positive, the lower control limit $L^-$ remained at 0, regardless of the attack.

Under the real vehicle setting, one CAN prototype node ℝ was programmed to run CIDS, and another node A as an adversary mounting a fabrication attack on an ECU. The attack was mounted by injecting a fabricated attack message with ID=0x1B0, which was sent every 20 ms by some real in-vehicle ECU, i.e., 𝔸 mounted the fabrication attack on the ECU sending 0x1B0. FIG. 7B shows how $O_{acc}$, e, $L^+$, $L^-$) changed for both cases of with and without an attack. Again, the attack message injected at around t=420 secs caused a sudden increase in $O_{acc}$, e, thus increasing $L^+$ to exceed $\Gamma_L$=5. As a result, CIDS declares the detection of an attack. After the attack, since 0x1B0 was still periodically sent by the in-vehicle ECU, the clock skew—i.e., the slope of $O_{acc}$ graph—remains unchanged.

To evaluate CIDS's defense, against the masquerade attack in the CAN bus prototype, nodes 𝔸 and 𝔹 were considered to have been compromised as strong and weak attackers as in FIG. 3C, respectively. 𝔸 was programmed to mount a masquerade attack on 𝔹, i.e., stop 𝔹 transmitting message 0x55 and instead send it through 𝔸 onwards, once $T_{masq}$=250 secs had elapsed. As usual, messages 0x11 and 0x13 were periodically sent by 𝔸, and CIDS was run by ℝ.

Figures 8D, 8E, 8F:
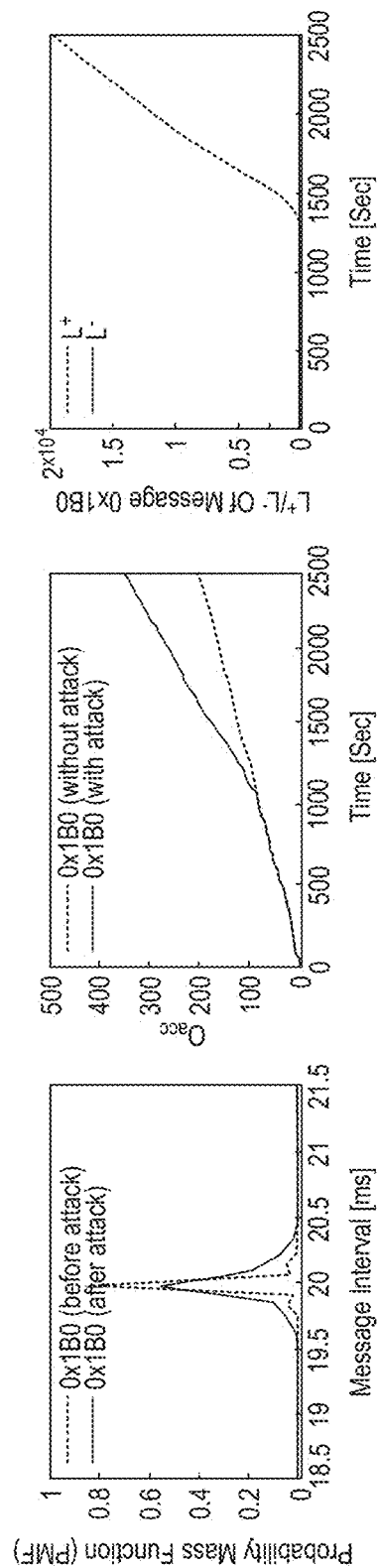
FIG. 8D-8F are graphs showing probability mass function of message intervals, changes in accumulated clock offsets, and control limits derived in CIDS, respectively, during a masquerade attack simulated on the real vehicle.

FIG. 8A (left) shows the Probability Mass Function (PMF) of the intervals of message 0x55: before and after the attack was mounted. In contrast to the fabrication attack, since the attacker sent the attack message at its original frequency after masquerading, the distribution did not deviate much from that before the attack. However, at $T_{masq}$, since there was some delay when the transmitter was switched from one node to another, the first masquerade attack message was sent 51.04 ms after its previous transmission, whereas it should have been approximately 50 ms which is the preset message interval of 0x55. Due to such a slightly mistimed masquerade attack, the PMF graph shows a message interval with an abnormal deviation from the mean.

The resulting changes in $O_{acc}$, $L^+$ and $L^-$ at ℝ are also shown in FIG. 8A (middle and right). The change in the ECU transmitting message 0x55 caused the slope (i.e., clock skew) in $O_{acc}$ graph to change after the attack was mounted. Since the measurements of $O_{acc}$ after $T_{masq}$ significantly deviated from their expected values, which is determined by the estimated clock skew of t<$T_{masq}$, the CUSUM control limits in CIDS exceeded the threshold, thus declaring detection of an intrusion. Since the transmitter of 0x55 was changed (to ECU 𝔸), its clock skew after t=$T_{masq}$ was equivalent to the clock skew in 0x11. Accordingly, via root-cause analysis, CIDS identifies the compromised ECU to be ECU 𝔸. Unlike the previous results, since the change in slope was negative, persistent identification error with high negative values caused the lower control limit $L^-$, to exceed the threshold.

To evaluate CIDS's defense against the masquerade attack in a real vehicle, we consider a scenario in which real in-vehicle ECUs $\mathbb{V}_1$ and $\mathbb{V}_2$ transmitting 0x1A6 and 0x1B0 are compromised as a strong and a weak attacker, respectively. Of the three CAN prototype nodes (𝔸, 𝔹, and ℝ), which were connected to the real in-vehicle network via OBD-II, we programmed node ℝ to run CIDS on in-vehicle message 0x1B0 and another node 𝔹 to simply log the CAN traffic.

To generate a scenario of the in-vehicle ECU $\mathbb{V}_1$ mounting a masquerade attack on ECU $\mathbb{V}_2$, ℝ was programmed further to receive message 0x1A6 instead of 0x1B0, but still record the received messages' ID to be 0x1B0, once $T_{masq}$=1100 seconds had elapsed. That is, let ℝ interpret 0x1A6 as 0x1B0 for t>$T_{masq}$ i.e., the transmitter of 0x1B0 changes from $\mathbb{V}_2$ to $\mathbb{V}\mathbb{V}_1$. Such a change in interpretation was achieved by programming ℝ modify its message acceptance filter from only accepting 0x1B0 to only accepting 0x1A6. Since 0x1B0 and 0x1A6 were observed to be always transmitted nearly at the same time, such a setting replicates the timed, masquerade attack. During such a process, 𝔹 continuously logged 0x1B0 so that we can obtain a reference for circumstances when no attacks are mounted.

FIG. 8B (left) shows the PMF of the message intervals of 0x1B0 before and after the attack. Since the message periodicity remained the same, the distribution of the messages intervals did not change. Moreover, since a timed masquerade attack is considered, in contrast to the result in FIG. 8A, there were no such abnormal message intervals. Such a result indicates that state-of-the-art IDSs, which try to find abnormal message frequencies, cannot detect such an attack. Although the distribution of message intervals remained unchanged, due to the change in ECU transmitting 0x1B0 ($\mathbb{V}_2 \to \mathbb{V}_1$, the accumulated clock offset suddenly exhibited a different trend in its change, i.e., a different clock skew after the attack. Here, the original trend in offset changes was determined by the data obtained from 𝔹. So, as shown in FIG. 8B, CIDS was able to detect a sudden shift in its identification error and thus outputted a high level of CUSUM upper control limit, i.e., an intrusion detection.

In conclusion, through its modeling and detection processes, CIDS can detect not only fabrication attack but also masquerade attack, i.e., is capable of doing not only what existing solutions can do, but also more.

The feasibility and efficiency of message-pairwise detection in CIDS is also evaluated. To validate its practicability in the real-world, first examine whether there exists a pair of messages inside a real vehicle with correlated clock offsets—the condition for CIDS to run message-pairwise detection.

Figures 9A, 9B:
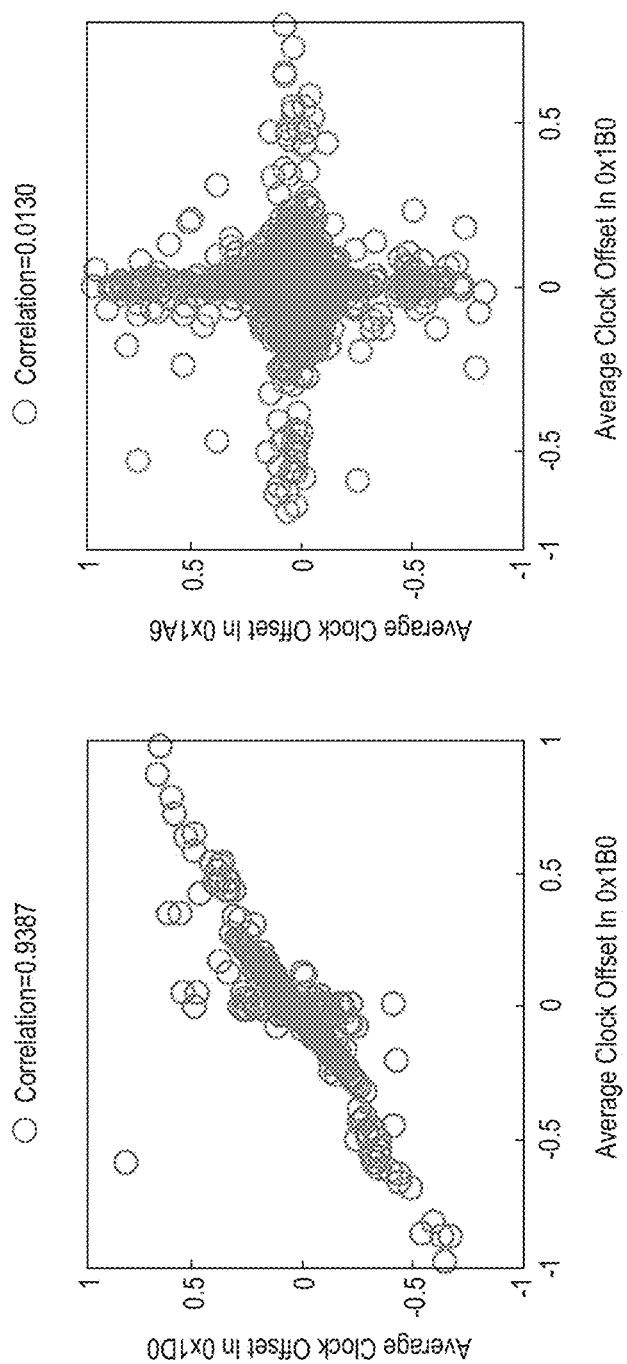
FIGS. 9A and 9B are plots showing correlated and uncorrelated clock offsets, respectively.

FIGS. 9A and 9B shows two cases of correlated and uncorrelated clock offsets, respectively, of in-vehicle messages collected from the Honda Accord 2013. FIG. 9A (left) shows that the average clock offsets of messages 0x1B0 and 0x1D0, which were determined to have been sent from the same ECU, showed a high correlation of 0.9387, i.e., linear relationship. In contrast, as shown in FIG. 9B (right), average clock offsets of messages 0x1B0 and 0x1A6, which were sent every 20 ms from different ECUs, showed a near 0 correlation. This observation from a real vehicle indicates the feasibility of message-pairwise detection in CIDS.

Figure 10A:
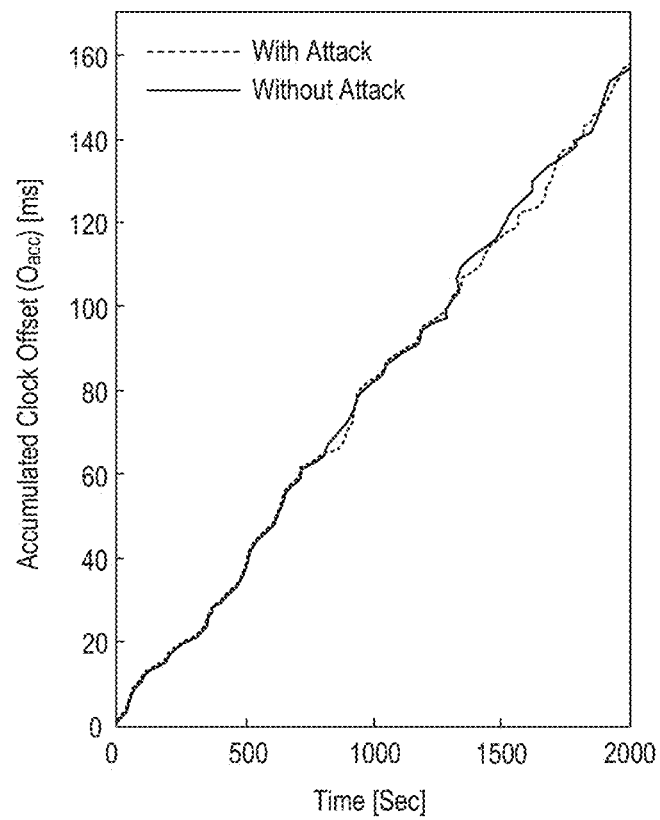
FIGS. 10A-10C are graphs showing accumulated clock offsets and control limits, respectively, against the worst-case masquerade attack via message-pairwise detect.
Figure 10B:
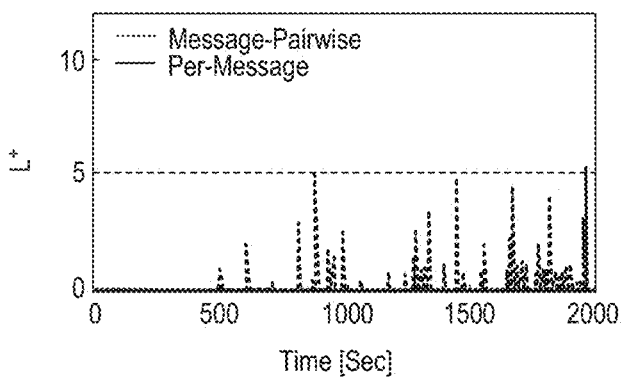
Figure 10C:
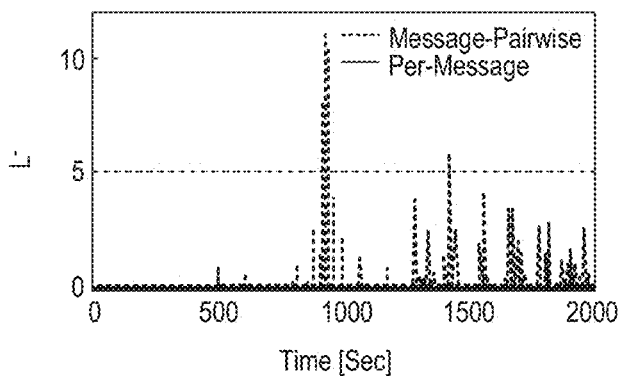

To show that message-pairwise detection can support per-message detection in decreasing false positives/negatives, consider a scenario in which an attacker $\mathbb{V}_1$ has mounted a masquerade attack on $\mathbb{V}_2$ at $t_{masq}$=800 secs. Refer to $\mathbb{V}_2$ as the in-vehicle ECU which originally transmits message 0x1B0. To consider the worst case in detecting the masquerade attack, assume that the clock skews of $\mathbb{V}_1$ and $\mathbb{V}_2$ are nearly equivalent. Such a worst-case scenario was replicated by randomly permuting the acquired offset values of 0x1B0 for $t > t_{masq}$, and considering the permuted values to be output from $\mathbb{V}_1$. As shown in FIG. 10A, this leads to a situation where the clock skew does not change even though the message transmitter has been changed from one ECU to another. Although clock skews may be equivalent, instantaneous clock offsets may not be. Since clock skews are distinct for different ECUs, the considered assumption may not hold in the real-world. However, we have included such a case for evaluation, as it could be a corner case for intrusion detection. Although the clock skew remained equivalent at $t = t_{masq}$ when the attack was mounted, the correlation between offsets of 0x1B0 and 0x1D0 suddenly dropped from 0.9533 to 0.1201, i.e., a linear to non-linear relationship. As a result, as shown in FIG. 10B, the control limits in CIDS's message-pairwise detection exceeded the threshold $\Gamma_L$=5. On the other hand, since the clock skews before and after the attack were equivalent, per-message detection was not able to detect the intrusion.

Figure 11:
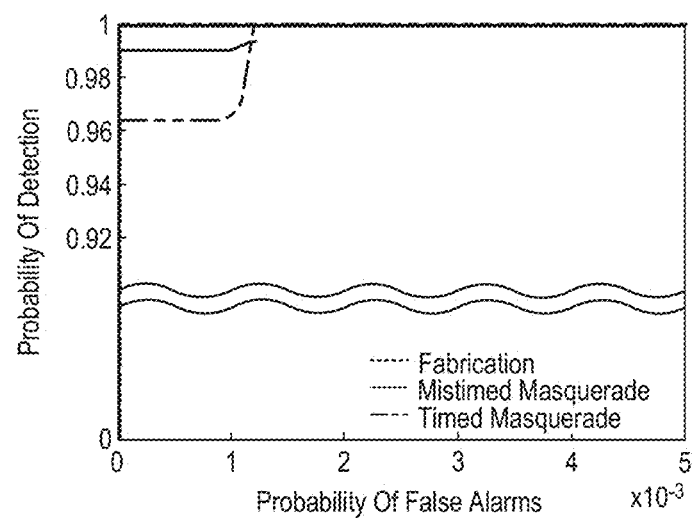
FIG. 11 is a graph showing a ROC curve of CIDS in the real vehicle setting.

Additionally, the false alarm rate of CIDS was examined under the real vehicle setting. The results obtained from the CAN bus prototype are omitted due to their insignificance, i.e., not many false alarms occurred due to its less complex bus traffic. The data retrieved from previous evaluations were used and modified to generate three attack datasets. Each dataset contained 300 different intrusions—with either different (attack) injection timings or changes in clock skews—each in the form of fabrication attack, mistimed masquerade attack, and timed masquerade attack. For each dataset, the $\mathcal{K}$ parameter of CIDS was varied to acquire one false positive rate (false-alarm rate) and one false negative rate (1-detection rate). FIG. 11 shows the performance of CIDS on the attack datasets as a Receiver Operating Characteristic (ROC) curve, which represents the trade-off between false alarm and detection. Clearly, CIDS is shown to be able to detect fabrication and masquerade attacks with a high probability. Since the timed masquerade attack is the most difficult to detect, it showed the highest false positive rate among all the attack scenarios considered. However, even in such a case with a false positive rate of 0.12%, CIDS did not miss any anomalies (100% true positives). Even for false positives<0.12%, 96.33% of the anomalies were detected by CIDS. By monitoring a norm traffic, these false-positives can be avoided with proper setting of $\mathcal{K}$.

There may be several ways the adversary may attempt to defeat CIDS. First, the adversary may try to compromise the ECU running CIDS and disable it. However, if cross-validation for CIDS was to be exploited, such an attempt can be nullified. For the detection of intrusions, CIDS only requires an ECU to record the timestamps of message arrivals. Such a low overhead makes it feasible for CIDS to be installed distributively across several in-vehicle ECUs for cross-validation. Suppose using CIDS, ECU $\mathbb{A}$ monitors attacks on messages $\{M_1, M_2\}$, ECU $\mathbb{B}$ monitors $\{M_2, M_3\}$, and ECU $\mathbb{C}$ monitors $\{M_1, M_3\}$. Since CIDS regards the receiver's time clock as the true clock, cross-validation provides multiple perspectives of clock behaviors for each message ID, e.g., two different perspectives of $M_2$ from $\mathbb{A}$ and $\mathbb{B}$. Thus, even when an ECU running CIDS gets compromised, cross-validation via CIDS can handle such a problem.

Another way the adversary may try to defeat CIDS is to adapt to how its algorithm is running and thus deceive it. The adversary may figure out the clock skew of the target ECU and then heat up or cool down the compromised ECU so that its clock skew changes to match that of the target. In such a case, the clock skew can be matched and thus may bypass CIDS's per-message detection. However, as discussed in Section 5.4, unless the adversary also matches the instantaneous clock offset, which is affected by the ECU's momentary workload and temperature, CIDS can detect the intrusion via message-pairwise detection.

False alarms for intrusion detection systems, especially in in-vehicle networks, are critical. Thus, CIDS should also deal with them as accurately as possible. To meet this requirement, if an intrusion has been determined, even after going through the verification process, CIDS can follow the following steps for further examination:

1. If an intrusion was detected while using only per-message detection, examine it further via message-pairwise detection.
2. If still alarmed as an intrusion and the attacked ECU is a safety-critical ECU, go straight to step 4.
3. If not, communicate with other ECUs for cross-validation as they would provide different perspectives of the clock skew results. If communicating with other ECU's incurs too much overhead (in terms of bus load, processing overhead, etc.), send traffic data for a remote diagnosis.
4. Request re-patching of firmware and advise the driver to stop the vehicle.

Although most modern in-vehicle networks are based on CAN, some may be equipped with other protocols, such as CAN-FD, TTCAN and FlexRay, for more complex operations. CAN-FD is an enhanced version of CAN, providing flexible and higher data rates. Since its basic components confirm to CAN and thus also lacks synchronization, CIDS can be applied to CAN-FD. For protocols such as TTCAN and FlexRay, nodes are periodically synchronized for determinative timing of message exchanges. The interval between two consecutive synchronizations depends on how each protocol is deployed. For TTCAN, it can be up to $2^{16}$=65536 bits long, i.e., 131 ms in a 500 Kbps bus. This lets some messages be sent multiple times between consecutive synchronizations. So, if the time interval is long, CIDS would still be able to extract clock skews from messages which are sent multiple times, whereas, if the period is short, CIDS may not be feasible. However, the fact that TTCAN and FlexRay have high implementation cost, whereas for CAN-FD it is minimal, makes CAN-FD a favorite candidate for next-generation in-vehicle networks. This means that CIDS can be applicable to not only current but also future in-vehicle networks.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting intrusions in a vehicle network, comprising:
    receiving, by a recipient electronic control unit (ECU), a plurality of messages from a transmitting ECU, where the plurality of messages are transmitted periodically from the transmitting ECU via the vehicle network to the recipient ECU and the plurality of messages do not include any timestamp information from the transmitting ECU;
    determining, by the recipient ECU, a clock skew for the transmitting ECU from the plurality of messages;
    detecting, by the recipient ECU, a sudden change in the clock skew for the transmitting ECU by comparing the clock skew for the transmitting ECU to a baseline value for the clock skew of the transmitting ECU; and
    identifying, by the recipient ECU, the transmitting ECU as compromised in response to detecting a sudden change in the clock skew for the transmitting ECU.

2. The method of claim 1 wherein determining clock skew further comprises
    determining, by the recipient ECU, a clock offset for each message in the plurality of messages, where clock offset is determined in relation to a first message received from amongst the plurality of messages;
    determining, by the recipient ECU, an accumulated clock offset for the plurality of messages by summing the determined clock offsets together; and
    determining, by the recipient ECU, slope of the accumulated clock offset.

3. The method of claim 1 further comprises determining the baseline value for the clock skew of the transmitting ECU from additional messages transmitted by the transmitting ECU and receive by the recipient ECU prior to the receipt of the plurality of messages.

4. The method of claim 3 further comprises determining a baseline value for the clock skew of the transmitting ECU using linear regression.

5. The method of claim 3 further comprises determining a baseline value for the clock skew of the transmitting ECU using a total least squares method.

6. The method of claim 1 further comprises detecting a sudden change between the accumulated clock offset and the baseline clock offset using a cumulative sum method.

7. The method of claim 1 further comprises disabling the transmitting ECU in response to detecting a sudden change in the clock skew for the transmitting ECU.

8. A method for detecting a compromised electronic control unit in a vehicle network, comprising:
    receiving, by a recipient electronic control unit (ECU), a plurality of messages from a transmitting ECU, where the plurality of message are transmitted from the transmitting ECU via the vehicle network to the recipient ECU;
    determining, by the recipient ECU, a clock offset for each message in the plurality of messages, where clock offset is determined in relation to a first message received from amongst the plurality of messages;
    determining, by the recipient ECU, an accumulated clock offset for the plurality of messages by summing the determined clock offsets together;
    computing, by the recipient ECU, a difference between the accumulated clock offset to a baseline clock offset;

detecting, by the recipient ECU, a sudden change in difference between the accumulated clock offset and the baseline clock offset; and identifying, by the recipient ECU, the transmitting ECU as compromised in response to detecting a sudden change in the differences between the accumulated clock offset and the baseline clock offset.

9. The method of claim 8 wherein determining clock offset further comprises calculating a difference between an estimated arrival time for a given message and an actual arrival time for the given message.

10. The method of claim 9 wherein the baseline clock offset is derived in part from messages from the transmitting ECU received by the recipient ECU prior to receiving the plurality of messages.

11. The method of claim 10 further comprises updating the baseline clock offset using a recursive least squares method.

12. The method of claim 11 further comprises determining an identification error between the accumulated clock offset and the baseline clock offset and updating the baseline clock offset as a function of the identification error, where the identification error is a difference between the accumulated clock offset and a product of the baseline clock offset and the elapsed time for transmitting the plurality of messages.

13. The method of claim 12 wherein detecting a sudden change between the accumulated clock offset and the baseline clock offset using a cumulative sum method.

14. The method of claim 13 further comprises computing a limit for the identification error as a function of a difference between the identification error and a mean of the identification error divided by variance of the identification error.

15. A non-transitory computer storage medium associated with a recipient electronic control unit (ECU) in a vehicle network and with instructions stored thereon, that when executed by a processor, perform the steps comprising:

receiving a plurality of messages from a transmitting ECU, where the plurality of message are transmitted from the transmitting ECU via the vehicle network to the recipient ECU;

determining clock offset for each message in the plurality of messages, where clock offset is determined in relation to a first message received from amongst the plurality of messages;

determining an accumulated clock offset for the plurality of messages by summing the determined clock offsets together;

computing a difference between the accumulated clock offset to a baseline clock offset;

detecting a sudden change in difference between the accumulated clock offset and the baseline clock offset; and identifying the transmitting ECU as compromised in response to detecting a sudden change in the differences between the accumulated clock offset and the baseline clock offset.

16. The non-transitory computer storage medium of claim 15 wherein determining clock offset further comprises calculating a difference between an estimated arrival time for a given message and an actual arrival time for the given message.

17. The non-transitory computer storage medium of claim 16 wherein the baseline clock offset is derived in part from messages from the transmitting ECU received by the recipient ECU prior to receiving the plurality of messages.

18. The non-transitory computer storage medium of claim 17 further comprises updating the baseline clock offset using a recursive least squares method.

19. The non-transitory computer storage medium of claim 18 further comprises determining an identification error between the accumulated clock offset and the baseline clock offset and updating the baseline clock offset as a function of the identification error, where the identification error is a difference between the accumulated clock offset and a product of the baseline clock offset and the elapsed time for transmitting the plurality of messages.

20. The non-transitory computer storage medium of claim 19 wherein detecting a sudden change between the accumulated clock offset and the baseline clock offset using a cumulative sum method.

* * * * *